Jan. 19, 1926.
F. D. ROBINSON
1,570,526
SPRING BUMPER FOR AUTOMOBILES
Filed Oct. 3, 1924
2 Sheets-Sheet 1
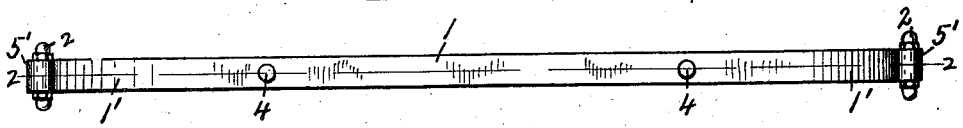
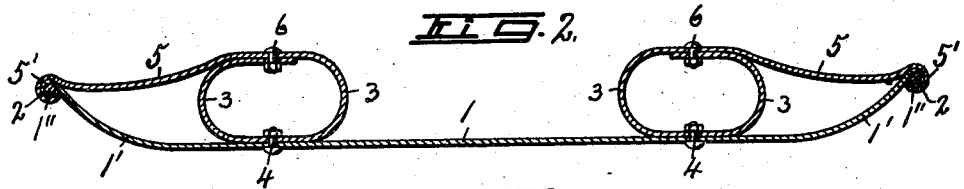
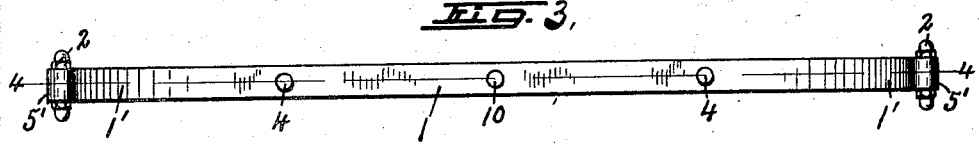
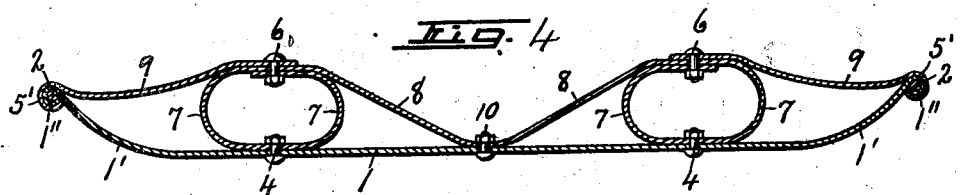
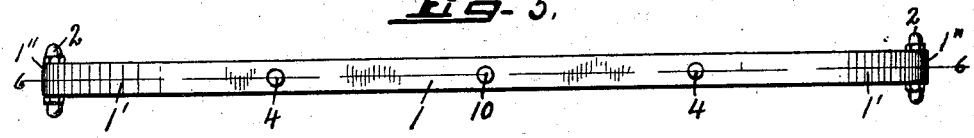
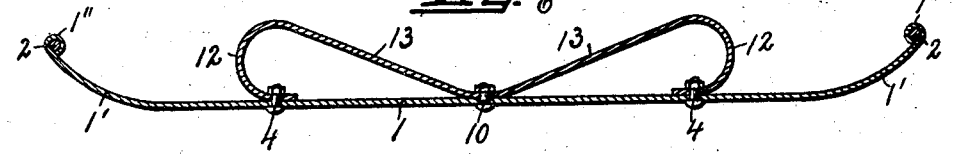
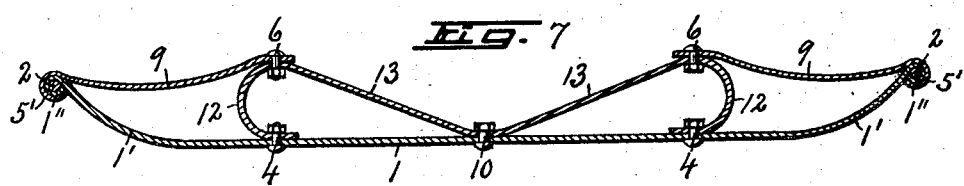
INVENTOR
F. D. Robinson
BY Denison & Thompson
ATTORNEYS
WITNESS
H. V. Furst Jan. 19, 1926.
F. D. ROBINSON
1,570,526
SPRING BUMPER FOR AUTOMOBILES
Filed Oct. 3, 1924   2 Sheets-Sheet 2
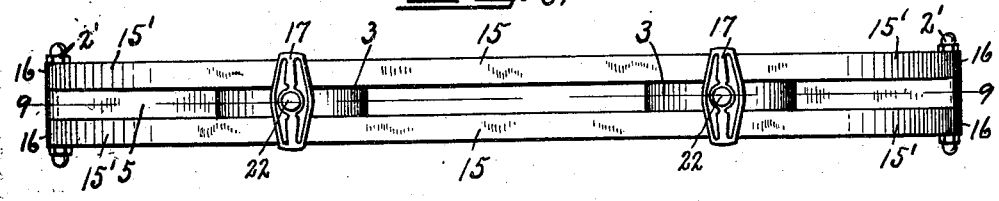
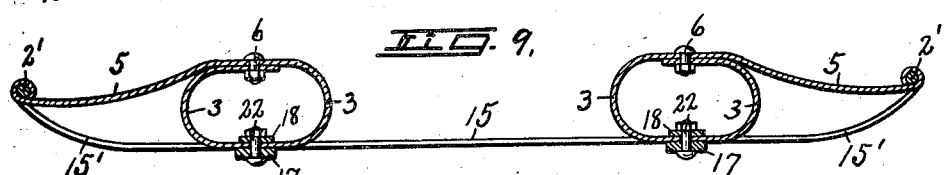
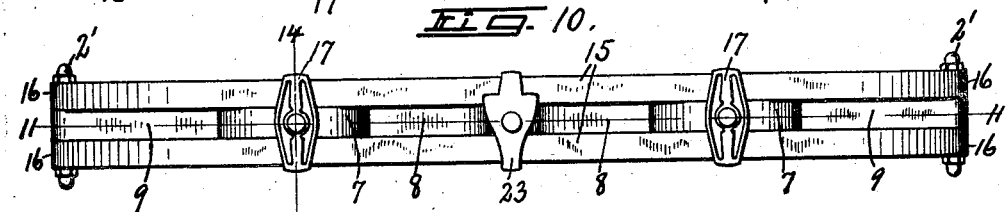
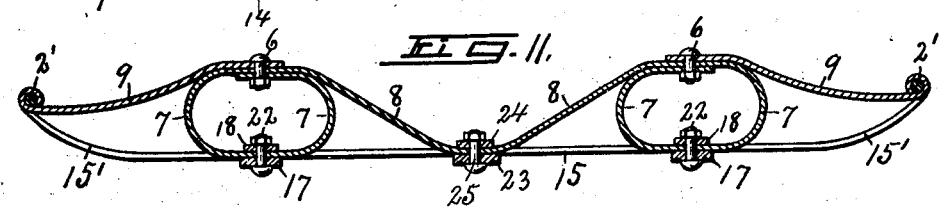
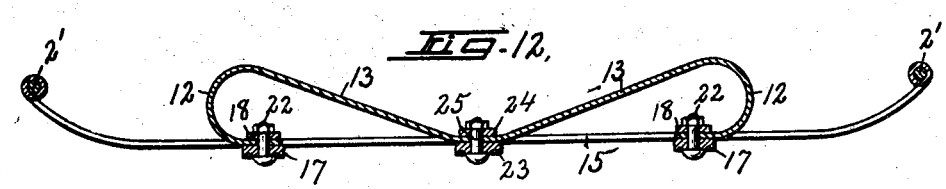
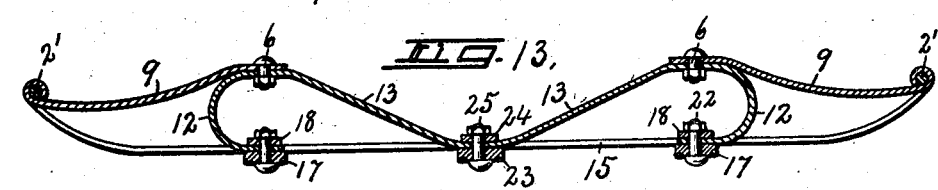
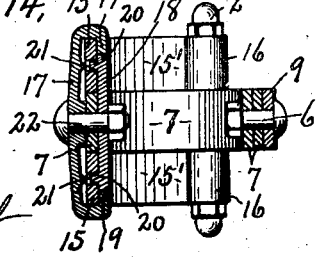
INVENTOR
F. D. Robinson
BY Denison & Thompson
ATTORNEYS
WITNESS
H. Hurst Patented Jan. 19, 1926.

1,570,526

UNITED STATES PATENT OFFICE.

FREDERICK D. ROBINSON, OF BALDWINSVILLE, NEW YORK, ASSIGNOR TO PENN SPRING WORKS INCORPORATED, OF BALDWINSVILLE, NEW YORK, A CORPORATION OF NEW YORK.

SPRING BUMPER FOR AUTOMOBILES.

Application filed October 3, 1924. Serial No. 741,371.

*To all whom it may concern:*

Be it known that I, FREDERICK D. ROBINSON, a citizen of the United States of America, and a resident of Baldwinsville, in the county of Onondaga, in the State of New York, have invented new and useful Improvements in Spring Bumpers for Automobiles, of which the following, taken in connection with the accompanying drawings, is a full, clear, and exact description.

This invention relates to spring bumpers for automobiles and analogous uses, in which a resilient impact member is reinforced or braced by a resilient supporting member mainly at the rear of the impact member, both members and their connections one with the other forming the bumper.

The main object is to provide the supporting or bracing member with rearwardly and laterally curved loops and arms extending tangentially from the rear side of the loops to the impact member and secured thereto for stiffening the central portion of the impact member where it is subjected to the most severe impact strains by contact with objects in the path of the moving machine. Other objects of the several modifications will be brought out in the following description.

In the drawings:

Figures 1 and 2 are respectively a front face view and a longitudinal sectional view taken on line 2—2, Figure 1, showing one form of bumper with a single impact bar and spaced loops connected by tangential arms to the end of the bar.

Figures 3 and 4 are respectively a front face view and a longitudinal sectional view, taken on line 4—4, Figure 3 showing a modified bracing element for the single impact bar.

Figures 5 and 6 are respectively a front face view and a longitudinal sectional view, taken on line 6—6, Figure 5 showing a further modified form of single bar impact element and brace element therefor.

Figure 7 is a longitudinal sectional view of the further modified form of bracing element showing the tangential arms of Figure 2 in connection with the double loop brace bar of Figure 6.

Figures 8 and 9 are respectively a front face view and a longitudinal sectional view taken on line 9—9, Figure 8 showing a double bar impact element and bracing members similar to those shown in Figure 2.

Figures 10 and 11 are respectively a front face view and a longitudinal sectional view taken on line 11—11 Figure 10 showing a further modified form of double bar impact member and brace members similar to those shown in Figures 3 and 4.

Figures 12 and 13 are longitudinal sectional views of further modifications of bumpers showing the brace members of Figures 6 and 7 respectively as used in connection with double bar impact members.

Figure 14 is an enlarged transverse vertical sectional view taken on line 14—14 Figure 10. The term "front" as used in the description of these bumpers applies specifically to those which are used on the front of the machine but it is evident that the same bumpers may be used on the rear of the machine in which case those members which are described as the front members or facing the front of the machine would be termed the rear members.

The bumpers shown in Figures 1 to 7 inclusive involve the use of a single-bar impact member —1—, all of which are of substantially identical construction in that each is made of resilient or spring metal and is provided with a substantially straight central portion and rearwardly curved end portions —1'— terminating in eyes —1"— for receiving suitable finishing bolts —2— having ornamental caps on both lower and upper ends for ornamentation as well as stiffening purposes, the only difference being that the eyes —1"— in Figures 5 and 6 are curved rearwardly while those of the remaining Figures 1, 2, 3, 4 and 7 are curved forwardly and that the two bolt holes for clamping said parts of the brace elements to the impact element are omitted in Figures 1 and 2.

The bracing element shown in Figures 1 and 2 comprises a bar of closed loops —3— arranged at the rear of the impact element in longitudinally spaced relation and having their front sides secured by bolts —4— to the rear faces of the impact element —1—, the inner or rear sides of the loops —3— being connected to the outer ends or eyes —1"— of the impact member —1— by additional brace members —5— extending laterally tangentially from the inner sides of the loops —3— and preferably form integral parts thereof, the other ends of the loops —3— being returned rearwardly along the inner faces of the arms —5— and secured thereto by bolts —6— thereby forming what has been previously termed the closed loops —3—.

The outer ends of the arms —5— are also provided with eyes —5'— which embrace the eyes —1"— for additional reinforcing purposes.

The loops —3— are located some distance inwardly from the eyes —5'— and —1"— and their front and rear sides are also spaced some distance apart thereby forming an open space between the arms —5— and curved portions —1'— of the impact member and permitting more or less resilient action between the front and rear sides of the loops and also between the curved ends —1'— and arms —5— of the bracing elements. In Figures 4 and 5 the bracing element comprises a pair of closed loops —7— and arms —8— and —9— extending laterally and tangentially from the inner sides of the loops which are arranged in longitudinally spaced relation at opposite sides of the center and at the rear of the impact element —1— and are secured by bolts —4— to the rear face of said impact member.

The loops —7— are preferbly formed integral with the arms —8— which, in turn, are integrally united to each other and are secured by a bolt —10— to the central portion of the impact bar —1—.

The brace members —9— are similar to the brace members —5— shown in Figures 1 and 2 except that they are made separate from the respective loops but are secured to the inner or rear faces thereof by bolts —6—.

In Figure 6 the bracing element comprises a pair of open loops —12— arranged at the rear of the impact bar —1— in longitudinally spaced relation at opposite sides of the center of said impact bar and having the front sides secured by bolts —4— to the rear face of the impact member.

A pair of bars —13— extend inwardly from the rear sides of the loops —12— tangentially thereto and preferably integral therewith and are united to each other and secured to the central portion of the impact bar —1— by a bolt —10—.

In Figure 7 is shown a bracing member similar to that shown in Figure 6 and additional bracing members —9— similar to those shown in Figures 3 and 4, the central bracing member consisting of the loops —12— and tangential arms —13— secured respectively to the rear face of the impact bar —1— by bolts —4— and —10— in a manner similar to that shown in Figure 6 while the inner ends of the brace members —9— are secured to the rear sides of the loops —12— by bolts —6—.

In Figures 8 to 13 inclusive the impact element is composed of two parallel and vertically spaced bars —15— similar to the bar —1— in that their opposite ends are curved rearwardly at —15'— and terminate in eyes —16— for receiving the finishing bolts as —2'— the central portions between the curved ends being substantially straight and disposed in the same vertical plane.

These bars —15— are held in spaced relation by similar clamping devices each consisting of a front plate —17— and a rear plate —18— located respectively mainly at the front and at the rear of the straight portions of the bars, the front plates —17— being recessed to receive said bars and are provided at both their lower and upper edges with rearwardly and downwardly turning flanges —19— for engaging the inner or rear faces of the bars.

The inner plates —18— are placed between the flanges —19— of the respective plates —17— and are provided with forwardly projecting lugs —20— engaging in apertures —21— in the bars —15— to assist in holding said bars in spaced relation and also against relative endwise movement, the plates of each clamping device being drawn tightly against opposite faces of the bars —15— and held in fixed relation to each other by clamping bolts —22— see Figure 14.

These clamping devices are used in all the modifications shown in Figures 8 to 13 inclusive and also serve as a means for clamping the bars —15— to the bracing elements used in connection therewith and presently described.

In Figures 10 to 13 inclusive is shown an additional clamp substantially midway between the previously described clamps and consisting of front and rear plates —23— and —24— and a clamping bolt —25— which serves to additionally hold the bars —15— in vertically spaced relation and also to clamp said bars to the central portions of the bracing elements used in connection therewith in the figures mentioned.

The bracing elements shown in Figures 8 and 9 are similar to those shown in Figures 1 and 2 while those shown in Figures 10 and 11 are similar to those shown in Figure 4 and the ones shown in Figures 12 and 13 correspond to those shown in Figures 6 and 7 and therefore the same reference letters applied to the bracing elements in Figures 1 to 7 inclusive, are also applied to the bracing elements shown in Figures 8 to 13 inclusive.

It will be noted, however, that the portions of the bracing elements shown in Figures 8 to 13 inclusive, adjacent to the impact element are positioned between the impact bars —15— and therefore assist in holding said bars —15— in spaced relation, the outer portions of the loops —3—, —7— and —12— being secured between the clamping members —17— and —18— by means of the bolts —22— while the arms —8— and —13— are secured between the bars —15— by the clamping members —23— and —24— and bolt —25—, the ends of the arms —5— and —9— being clamped between the outer ends of the bars —15— by the bolts —2'— thereby establishing firm connections between the impact element and bracing element.

It will be noted that in all these various modifications the impact element, whether one bar or two bars, is supported by the bracing element and that both elements are made of resilient or spring metal thereby establishing a resilient connection between the impact element and the bracing element through the medium of the loops —3—, —7— or —12— and also through the medium of the arms —5— and —9—, and —8— and —13— all contributing to the carrying out of the one object of strengthening the impact element and at the same time providing additional resiliency thereto to compensate for varying pressures which may be brought to bear against the bumper as a whole by impact with objects which may be in the path of the machine and also reducing the liability of friction of the various parts of the bumper by such impact.

What I claim is:

1. An automobile bumper comprising a resilient impact member having bolt-eyes at both ends, and supporting means for the impact member including reversely arranged spring loops having outer convex portions facing the adjacent bolt-eyes a sufficient distance inwardly therefrom to allow the bolt-eye ends of the impact member to flex in the direction of convexity of said convex portions relatively thereto.

2. An automobile bumper as in claim 1 in which means is provided for connecting one end of each loop to the impact member in combination with brace-members connecting the other ends of the loops with the central portion of the impact member.

3. An automobile bumper as in claim 1 in which clamping devices secure corresponding ends of the loops to the impact member, and brace members having their inner ends secured to the other ends of the loops and their outer ends provided with eyes registering with the adjacent eyes of the impact member.

4. An automobile bumper as in claim 1 in which separate devices are provided for clamping corresponding ends of the loops to the impact member at opposite sides of the center thereof in combination with brace-members secured to the other ends of the loops and to the central portion of the impact member, and additional brace members secured to said other ends of the loops and extended outwardly therefrom and having their outer ends provided with eyes registering with the adjacent eyes of the impact member.

5. An automobile bumper comprising a resilient impact member having bolt-eyes at both ends, and supporting means for the impact member including separate pairs of reversely arranged loops at opposite sides of the center of the impact member, and devices for clamping corresponding ends of the loops to the impact bar.

6. An automobile bumper comprising a resilient impact member having bolt-eyes at both ends, and supporting means for the impact member including separate pairs of reversely arranged loops at opposite sides of the center of the impact member, and devices for clamping corresponding ends of the loops to the impact bar, and brace members secured to the other ends of the loops and to the central portion of the impact member.

7. An automobile bumper comprising a resilient impact member having bolt-eyes at both ends, and supporting means for the impact member including separate pairs of reversely arranged loops at opposite sides of the center of the impact member, and devices for clamping corresponding ends of the loops to the impact bar, and brace members secured to the other ends of the loops and to the central portion of the impact member, and brace members secured to the other ends of said loops and extended outwardly therefrom and having their outer ends provided with eyes registering with the adjacent eyes of the impact member.

8. An automobile bumper comprising a resilient impact member having bolt-eyes at both ends, and supporting means for the impact member including separate pairs of reversely arranged loops at opposite sides of the center of the impact member, and devices for clamping corresponding ends of the loops to the impact bar, and brace members secured to the other ends of the loops and to the central portion of the impact member, and brace members secured to the other ends of said loops and extended forwardly and outwardly therefrom, the outer ends of the outwardly extending brace members being provided with eyes registering with the adjacent eyes of the impact member and devices for clamping the inwardly extending brace members to the central portion of the impact member.

In witness whereof I have hereunto set my hand this 26th day of September, 1924.

FREDERICK D. ROBINSON.